United States Patent [19]

Machida et al.

[11] 4,295,157
[45] Oct. 13, 1981

[54] SIGNAL GENERATING CIRCUIT IN A COLOR TELEVISION SYSTEM

[75] Inventors: Toyotaka Machida; Yuichi Ikemura, both of Iwai, Japan

[73] Assignee: Victor Company of Japan, Ltd., Yokohama, Japan

[21] Appl. No.: 16,541

[22] Filed: Feb. 23, 1979

[30] Foreign Application Priority Data

Feb. 25, 1978 [JP] Japan .................................. 53/21228

[51] Int. Cl.³ .............................................. H04N 9/44
[52] U.S. Cl. ........................................ 358/17; 358/16
[58] Field of Search ....................... 358/17, 12, 16, 25, 358/150, 151; 331/18, 19, 20

*Primary Examiner*—Robert L. Richardson
*Attorney, Agent, or Firm*—Haseltine & Lake

[57] ABSTRACT

A signal generating circuit in a color television system comprises a circuit for producing a signal of a frequency of 282 nfh (where n is an integer, and fh is a PAL-system horizontal scanning frequency) or a signal of a frequency closely approximating 282 nfh, a frequency-divider for frequency-dividing to 1/161 the signal of the frequency 282 nfh or a frequency closely approximating 282 nfh, and a circuit for forming, while satisfying the relationship $(282 \times 162)$ nfh $\approx 161$ nfsc (where fsc is the PAL-system chrominance sub-carrier wave frequency), a signal of a frequency closely approximating the frequency fsc or of the frequency fsc and signals of frequencies fh and fv (where fv is the PAL-system vertical scanning frequency) or of frequencies respectively closely approximating the frequencies fh and fv.

10 Claims, 4 Drawing Figures

SIGNAL GENERATING CIRCUIT IN A COLOR TELEVISION SYSTEM

BACKGROUND OF THE INVENTION

The present invention relates generally to signal generating circuits in colour television systems and more particularly to a signal generating circuit which is used in colour television cameras and the like and, with a simple circuit organization, is capable of generating chrominance sub-carrier wave signals, horizontal scanning frequency signals, vertical scanning frequency signals, and the like of PAL systems and SECAM systems.

In general, in a colour television camera, a colour television game device, or the like, there is provided a circuit for generating signals such as a chrominance sub-carrier wave signal, a horizontal synchronizing signal, and a vertical synchronizing signal.

In general, the frequency fsc of the chrominance sub-carrier wave of a colour television video signal of a PAL system is selected at a value expressed by the following equation in terms of the horizontal scanning frequency fh ($=15,625$ Hz) and the vertical scanning frequency fv ($=50$ Hz).

$$fsc = (284 - \tfrac{1}{4})fh + fv/2 = 4,433,618.75 \text{ Hz} \quad (1)$$

The chrominance sub-carrier wave frequency fsc and the horizontal scanning frequency fh have the following mutual relation.

$$709,379\, fh = 2,500\, fsc \quad (2)$$

That is, in a PAL system, as is indicated in Eq. (1), a frequency offset of fh/4 is provided in order to cause the chrominance sub-carrier wave to undergo interleaving with the horizontal scanning frequency, and a frequency offset of fv/2 is set in order to reduce cross colour to an inconspicuous degree. For this reason, even when the chrominance sub-carrier wave frequency fsc or a frequency value which is an integral multiple thereof is frequency-divided in a simple manner, the horizontal scanning frequency fh and the vertical scanning frequency fv cannot be obtained.

Accordingly, a signal generating circuit known heretofore has had an organization comprising a reference signal generator for generating a signal of a frequency of 284 fh, a pulse generator for frequency-dividing and wave-shaping the signal from the reference signal generator and generating signals of the horizontal scanning frequency fh and the vertical scanning frequency fv, a ¼ frequency divider for ¼ frequency-dividing the signal of the horizontal scanning frequency fh thus generated, a ½ frequency divider for ½ frequency-dividing the signal of the vertical scanning frequency fv thus generated, a first frequency subtraction circuit for carrying out subtraction of the signal of frequency fh/4 from the ¼ frequency divider and the signal of frequency fv/2 from the ½ frequency divider, and a second frequency subtraction circuit for carrying out subtraction of the signal of frequency 284 fh from the reference signal generator and the resulting signal of frequency (fh/4 − fv/2) from the first frequency subtraction circuit. From the second frequency subtraction circuit, a chrominance sub-carrier wave signal of the PAL system of a frequency of $284\, fh - (fh/4 - fv/2) = (284 - \tfrac{1}{4})fh + fv/2$ is obtained.

For each of the frequency subtraction circuits mentioned above, a double balanced modulator or a circuit comprising a combination of a balanced modulator and a single-sideband filter is generally used. A frequency subtraction circuit of such an organization, however, has been accompanied by the problem of complicated circuit organization. Furthermore, since the frequency of a leakage carrier (upper sideband, etc.) included in the output of a balanced modulator is close to the required output frequency, it is necessary to connect a band-pass filter having a steep cutoff characteristic to the output side of the balanced modulator. Then, since the frequency value represented by (fh/4 − fv/2) is low, the cutoff frequency of this band-pass filter must be low. It has been difficult to produce at low cost a band-pass filter having such a low value of cutoff frequency and, moreover, a steep cutoff characteristic.

Thus, the above described known signal generator employs two frequency subtraction circuits of complicated circuitry and high cost, and for this reason, the entire circuit has been of complicated organization and high price.

One the other hand, in order to obtain a signal generating circuit for a PAL system of inexpensive organization, omission of the above described first frequency subtraction circuit and omission of the offsetting of the frequency of fv/2 has been tried in the prior art. However, in a signal generating circuit of such an organization, the frequency relationship departs greatly from that of Eq. (1), whereby the performance deteriorates markedly, and the circuit cannot be used in actual practice.

SUMMARY OF THE INVENTION

Accordingly, it is a general object of the present invention to provide a novel and useful signal generating circuit in a colour television system in which the above described problems encountered heretofore are overcome.

Another and specific object of the invention is to provide a signal generating circuit in a colour television system, which circuit is of an organization such that the relationship between the chrominance sub-carrier wave frequency fsc of a colour television video signal of a PAL system and the horizontal scanning frequency fh satisfies the expression $$(282 \times 162)nfh \approx 161 nfsc,$$

where n is a positive integer. The signal generating circuit of the present invention includes a frequency divider for counting down a signal frequency to 1/161. Furthermore, at the most one frequency subtraction circuit is used, or a frequency subtraction circuit is unnecessary.

Still another object of the invention is to provide a signal generating circuit in a colour television system which circuit, with the above described organization, is capable of generating signals of a PAL-system chrominance sub-carrier wave frequency and, in addition, of a chrominance sub-carrier wave frequency of a SECAM system or a frequency close thereto.

Other objects and further features of the invention will be apparent from the following detailed description when read in conjunction with the accompanying drawings.

DETAILED DESCRIPTION

Figure 1:
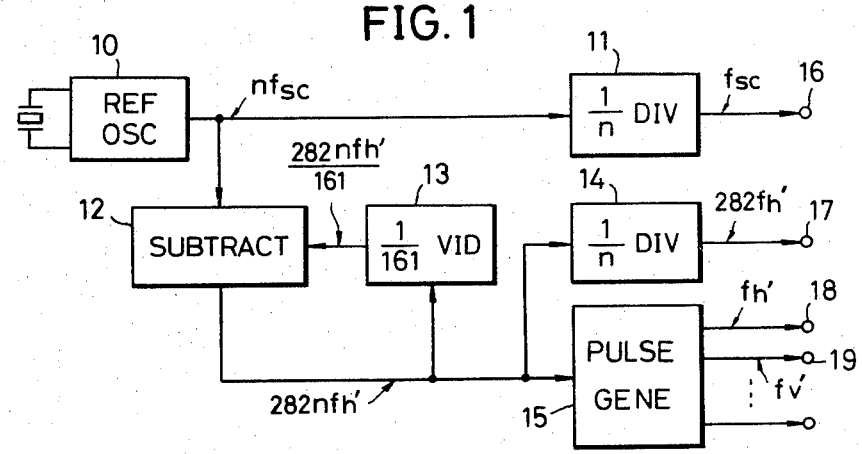
FIGS. 1, 2, 3, and 4 are block schematic diagrams respectively of first, second, third, and fourth embodiments of the signal generating circuit according to the invention in a colour television system.

In the first embodiment of the signal generating circuit of the invention illustrated in FIG. 1, a reference signal generator 10 generates a reference signal of a frequency nfsc, which is fed respectively to a 1/n frequency divider 11 and a frequency subtraction circuit 12. This signal of the frequency nfsc is frequency-divided to 1/n by the frequency divider 11, and a PAL-system chrominance sub-carrier wave signal of a frequency fsc is led out through an output terminal 16. The signal of the frequency nfsc supplied as a minuend to the frequency subtraction circuit 12 is subjected to subtraction with a signal from a 1/161 frequency divider 13. As a result, a signal of a frequency 282 nf'h is produced as output by the frequency subtraction circuit 12 and supplied respectively to the 1/161 frequency divider 13, a 1/n frequency divider 14, and a pulse generator 15.

This signal of the frequency 282 nf'h is frequency-divided to 1/n by the frequency divider 14, which thereupon produces a chrominance sub-carrier wave signal of a SECAM system of a frequency 282 f'h, which is led out through an output terminal 17. The pulse generator 15 frequency-divides and shapes the waveform of the signal of the frequency 282 nf'h supplied thereto. As a result, a horizontal synchronizing signal and a vertical synchronizing signal are led out respectively through output terminals 18 and 19, and horizontal and vertical drive pulses, blanking pulses, and other pulses are led out through another output terminal.

The signal of the frequency 282 nf'h supplied to the 1/161 frequency divider 13 is thereby frequency-divided to 1/161, being rendered into a signal of a frequency 282 nf'h/161, and is thereafter fed as a subtrahend to the frequency subtraction circuit 12. Therefore, the frequency 282 nf'h of the signal led out from the frequency subtraction circuit 12 is expressed by the following equation.

$$282\ nf'h = nfsc - (282\ nf'h/161)$$

Accordingly, the relationship of the following equation is satisfied.

$$(282 \times 162)nf'h = 161 nfsc \quad (3a)$$

Then, since the chrominance sub-carrier wave frequency fsc is 4433618.75 Hz, f'h is 15625.0026 Hz. Originally, however, the horizontal scanning frequency fh satisfies Eq. (2) set forth hereinbefore and is 15625 Hz. Therefore, the error relative to the original horizontal scanning frequency fh of the horizontal scanning frequency f'h obtained through the output terminal 18 by the circuit of the present embodiment of the invention is a mere 0.0026 Hz. Furthermore, the vertical scanning frequency f'v obtained through the output terminal 19 is 50.0000083 Hz, and the error relative to the original vertical scanning frequency (50 Hz) is a mere 0.0000083 Hz.

Accordingly, in accordance with the circuit of the present embodiment of the invention, an accurate chrominance sub-carrier wave frequency fsc and horizontal and vertical scanning frequency signals of frequencies f'h and f'v respectively approximating (substantially equal to) the original horizontal and vertical scanning frequencies fh and fv are obtained through the use of only a single frequency subtraction circuit 12 as frequency subtraction means. Therefore, in comparison with a known circuit employing two frequency subtraction circuits, the present invention affords a simpler circuit organization. Furthermore, since the frequency (282 nf'h) of the output signal of the frequency subtraction circuit 12 in the circuit of the invention is high, there are afforded advantageous features such as the ease of making a filter having a steep cutoff characteristic as a filter for removing a sideband combined in the output of the frequency subtraction circuit 12.

Figure 2:
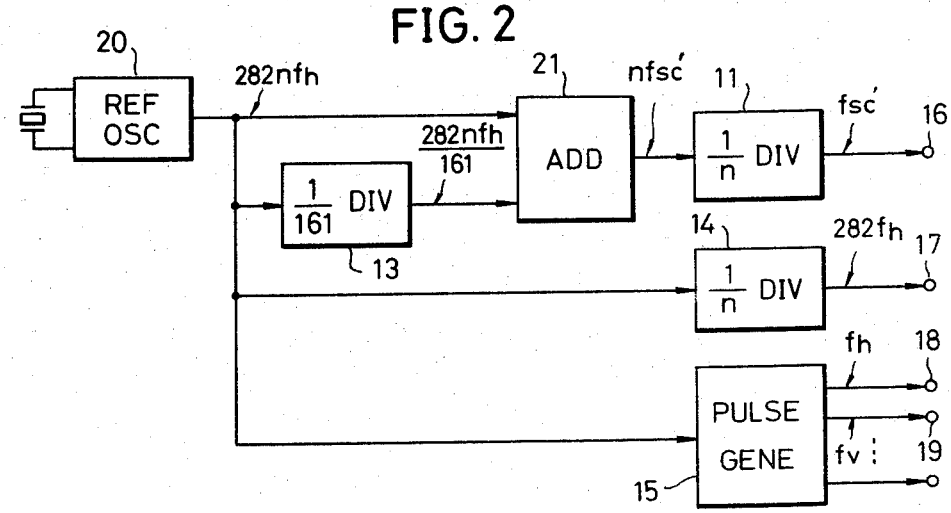

The second embodiment of the circuit of the present invention will now be described with reference to FIG. 2. In FIG. 2, those parts which are the same as or equivalent to corresponding parts in FIG. 1 are designated by like reference numerals are will not be described again in detail. A reference signal generator 20 generates a reference signal of a frequency of 282 nfh, which is supplied respectively to a frequency adder 21, a 1/161 frequency divider 13, a 1/n frequency divider 14, and a pulse generator 15.

The signal of the frequency of 282 nfh supplied to the frequency divider 13 is here frequency-divided to 1/161, thereby being rendered into a signal of a frequency of 282 nfh/161, which is supplied to the frequency adder 21. In this frequency adder 21, the signal of the frequency of 282 nfh from the reference signal generator 20 and the signal of the frequency of 282 nfh/161 from the frequency divider 13 are added. The resulting output signal of the frequency adder 21 of a frequency nf'sc is frequency-divided to 1/n by a 1/n frequency divider 11. The resulting output of the 1/n frequency divider 11 is a chrominance sub-carrier wave signal of a frequency of f'sc, which is led out through an output terminal 16.

Here, the frequency nf'sc of the output signal of the frequency adder 21 is expressed by the following equation.

$$nf'sc = 282\ nfh + (282 nfh/161)$$

Accordingly, the relationship of the following equation is satisfied.

$$(282 \times 162)nfh = 161 nf'sc \quad (3b)$$

The signal of the frequency 282 nfh supplied to the frequency divider 14 is here frequency-divided to 1/n, whereupon, as the resulting output of the frequency divider 14, a SECAM-system chrominance sub-carrier wave signal of a frequency of 282 fh is led out through an output terminal 17. Furthermore, through the output terminals 18 and 19 of the pulse generator 15, a signal of a horizontal scanning frequency of fh (15625 Hz) and a signal of a vertical scanning frequency fv (50 Hz) are respectively led out.

Here, the chrominance sub-carrier wave frequency f'sc of the signal obtained through the output terminal 16 is 4433618.012 Hz, and the error relative to the regular PAL-system chrominance sub-carrier wave frequency fsc (4433618.75 Hz) is mere 0.738 Hz, which is a value falling well within the CCIR broadcasting standard specification.

Figure 3:
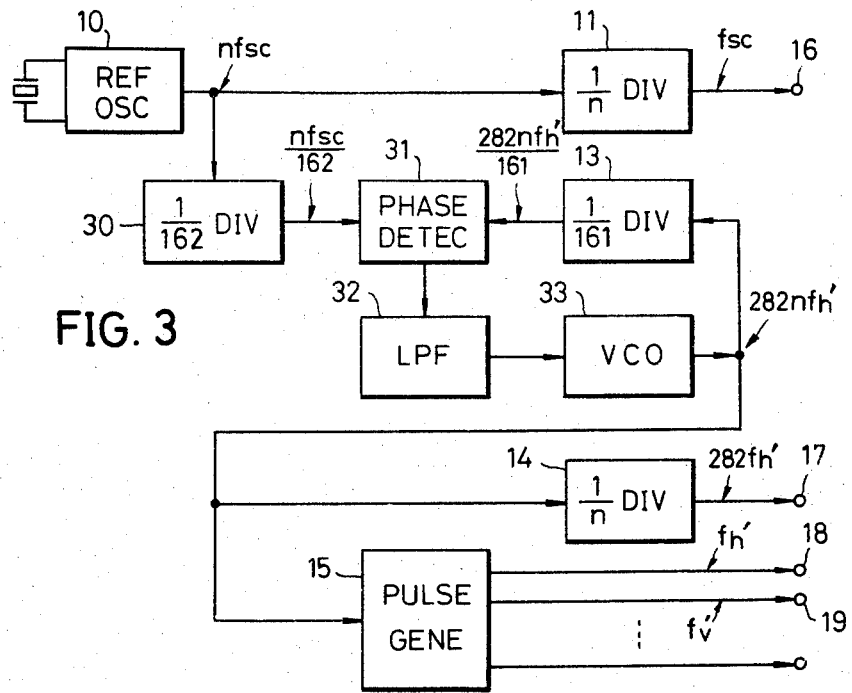

Next, the third embodiment of the circuit of the invention will be described with reference to FIG. 3. In FIG. 3, those parts which are the same as or equivalent to corresponding parts in FIG. 1 are designated by like reference numerals. The output signal of a frequency of nfsc of a reference generator 10 is, on one hand, frequency-divided to 1/n by a 1/n frequency divider 11, whereby a PAL-system chrominance sub-carrier wave signal of a frequency of fsc is led out through an output terminal 16. The output signal of the reference generator 10 is supplied to a 1/162 frequency divider 30 and thereby frequency-divided to 1/162. The resulting output signal of a frequency of nfsc/162 from the frequency divider 30 is supplied to a phase discriminator 31, where it is phase-compared with a signal from a 1/161 frequency divider 13. The resulting output signal of the phase discriminator 31 is supplied by way of a low-pass filter 32 to a voltage-controlled oscillator (VCO) 33. The VCO 33 oscillates with a frequency of 282 nf'h, and the oscillation output thereof is supplied respectively to the 1/161 frequency divider 13, a 1/n frequency divider 14, and a pulse generator 15.

The signal of the frequency 282 nf'h from the VCO 33 is frequency-divided to 1/161 by the frequency divider 13, and the resulting output thereof of a frequency of 282 nf'h/161 is supplied to the phase discriminator 31. In this case, the frequencies of the signals supplied from the frequency dividers 30 and 13 to the phase discriminator 31 are set to be mutually equal. That is, nfsc/162=282 nf'h/161. Accordingly, Eq. (3a), which sets forth that (282×162) nf'h×161 nfsc, is satisfied.

A SECAM-system chrominance sub-carrier wave signal of a frequency 282 f'h, a horizontal scanning frequency signal of a frequency f'h, and a vertical scanning frequency signal of a frequency f'v are respectively led out through output terminals 17, 18, and 19 similarly as in the first embodiment of the invention described hereinbefore in conjunction with FIG. 1.

Figure 4:
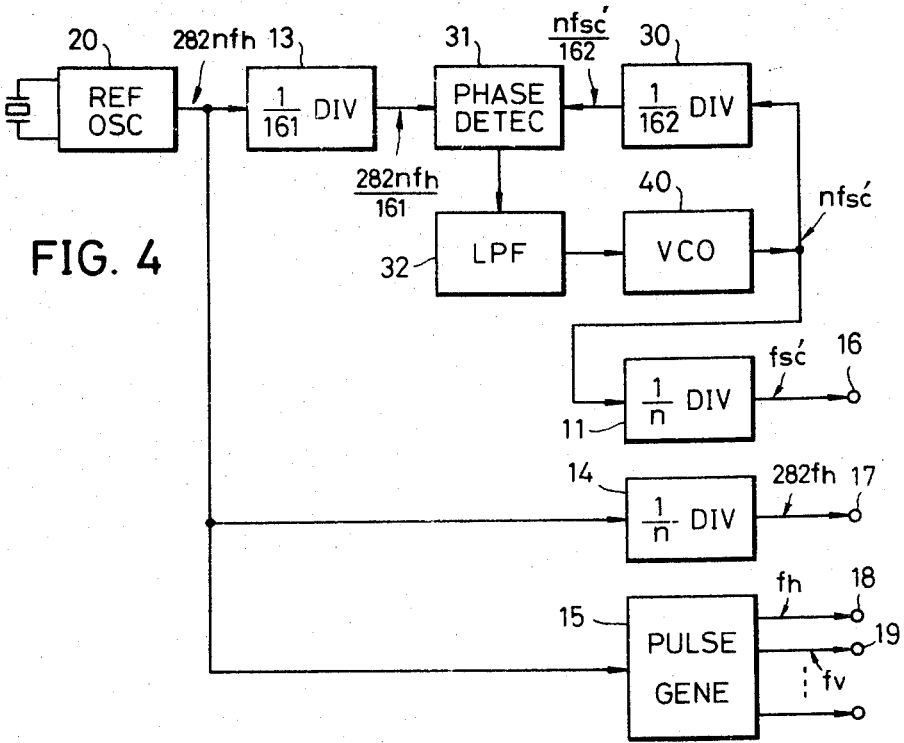

The fourth embodiment of the circuit of the invention will now be described with reference to FIG. 4. In FIG. 4, those parts which are the same as or equivalent to corresponding parts in FIGS. 2 and 3 are designated by like reference numerals. The output signal of a frequency of 282 nfh from a reference signal generator 20 is supplied respectively to a 1/161 frequency divider 13, a 1/n frequency divider 14, and a pulse generator 15.

The output signal of a frequency of 282 nfh/161 from the frequency divider 13 is fed to a phase discriminator 31. A voltage-controlled oscillator (VCO) 40 generates a signal of a frequency of nf'sc. This oscillation output is frequency-divided to 1/162 by a frequency divider 30, whose output signal of a frequency of nf'sc/162 is supplied to a phase discriminator 31. Here, the frequencies of the signals supplied from the frequency dividers 13 and 30 to the phase discriminator 31 are set equal to each other. That is, 282 nfh/161=nf'sc/162. Therefore, Eq. (3b) set forth hereinabove, (282×162) nfh=161 nf'sc, is satisfied.

A PAL-system chrominance sub-carrier wave signal of a frequency f'sc, a SECAM-system chrominance sub-carrier wave signal of a frequency 282 fh, a horizontal scanning frequency signal of a frequency fh, and a vertical scanning frequency signal of a frequency fv are respectively led out through output terminals 16, 17, 18, and 19 similarly as in the second embodiment of the invention described hereinbefore with reference to FIG. 2.

In the above described third and fourth embodiments of the invention, components such as frequency subtraction circuits and an adder are not used, but a kind of phase-locked loop including a phase discriminator, a low-pass filter, a VCO and other components is employed. For this reason, the circuit as a whole can be readily produced in the form of an integrated circuit (IC). Furthermore, the circuit as a whole can be adapted to use digital signals. On this point also, the circuit can be produced as an IC, whereby the production cost of the circuit can be further reduced.

As will be apparent from the above description with respect to the four embodiments of the invention, in accordance with the present invention, the frequency relationship expressed by Eq. (3a) or Eq. (3b), that is, the following Eq. (3) is set and used.

$$(282 \times 162)\, nfh \approx 161\, nfsc \tag{3}$$

Since an approximation equation of Eq. (3) is used in this manner, there is no necessity in the circuit of the present invention of frequency offsets of fh/4 and fv/2 as in a known circuit. Accordingly, two frequency subtraction circuits are unnecessary, whereby the circuit organization is simple.

Further, this invention is not limited to these embodiments but various variations and modifications may be made without departing from the scope of the invention.

What is claimed is:

1. A signal generating circuit in a colour television system, said circuit comprising:
   first means for producing a signal of a frequency of nfsc;
   second means for producing a signal of a frequency of 282 nf'h;
   third means for frequency-dividing to 1/161 the signal of the frequency 282 nf'h to produce a signal of a frequency 282 nf'h/161, said second means producing the signal of the frequency 282 nf'h in response to the signal of the frequency nfsc and the signal of the frequency 282 nf'h/161 so that the relationship (282×162) nf'h=161 nfsc is satisfied;
   fourth means for frequency-dividing to 1/n the frequency nfsc of the signal from the first means thereby to produce the PAL-system chrominance sub-carrier wave signal of a frequency fsc; and
   fifth means supplied with the output signal of the second means and producing an approximational signal of the PAL-system horizontal scanning frequency and an approximational signal of the PAL-system vertical scanning frequency respectively of frequencies f'h and f'v.

2. A signal generating circuit in a colour television system, said circuit comprising:
   reference signal oscillation means for oscillating a reference signal of a frequency of nfsc (where n is an integer, and fsc is a PAL-system chrominance sub-carrier wave frequency);
   frequency-subtraction means supplied with the reference signal of the frequency nfsc as a minuend signal and producing a signal of a frequency of 282 nf'h (where f'h is a frequency closely approximating the PAL-system horizontal scanning frequency fh);

1/161 frequency-dividing means for frequency-dividing to 1/161 the frequency 282 nf'h of the output signal of the frequency-subtraction means thereby to produce as output a signal of a frequency of 282 nf'h/161 and supplying the same as a subtrahend to the frequency-subtraction means, a subtraction nfsc- (282 nf'h/161)=282 nf'h being carried out by the frequency-subtraction means, that is, the relationship (282×162) $nf'h = 161 nfsc$ being satisfied;

1/n frequency-dividing means for frequency-dividing to 1/n the frequency nfsc of the reference signal from the reference signal oscillation means thereby to produce the PAL-system chrominance sub-carrier wave signal of a frequency fsc; and means supplied with the output signal of the frequency-subtraction means and producing an approximational signal of the PAL-system horizontal scanning frequency and an approximational signal of the PAL-system vertical scanning frequency respectively of frequencies f'h and f'v.

3. A signal generating circuit as claimed in claim 2 which further comprises second 1/n frequency-dividing means for frequency-dividing to 1/n the frequency of the output signal of the frequency-subtraction means thereby to produce an approximational SECAM-system chrominance sub-carrier wave signal of a frequency 282 f'h.

4. A signal generating circuit in a colour television system, said circuit comprising:
   reference signal oscillation means for oscillating a reference signal of a frequency 282 nfh (where n is an integer, and fh is a PAL-system horizontal scanning frequency);
   frequency-addition means supplied with the reference signal from the reference signal oscillation means and producing a signal of a frequency nf'sc (where f'sc is a frequency closely approximating the PAL-system chrominance sub-carrier wave frequency fsc);
   1/161 frequency-dividing means for frequency-dividing to 1/161 the frequency of 282 nfh of the reference signal from the reference signal oscillation means thereby to produce as output a signal of a frequency 282 nfh/161 and supplying said output signal to the frequency-addition means, an addition 282 $nfh + (282\ nfh/161) = nf'sc$ being carried out in the frequency-addition means, that is, the relationship (282×162) $nfh = 161\ nf'sc$ being satisfied;
   1/n frequency-dividing means for frequency-dividing to 1/n the frequency nf'sc of the signal from the frequency-addition means and producing a signal of a frequency f'sc; and
   means supplied with the reference signal from the reference signal oscillating means and producing signals of the PAL-system horizontal scanning frequency and vertical scanning frequency respectively of frequencies fh and fv.

5. A signal generating circuit as claimed in claim 4 which further comprises second 1/n frequency-dividing means for frequency-dividing to 1/n the frequency of the reference signal from the reference signal oscillating means thereby to produce a SECAM-system chrominance sub-carrier wave of a frequency 282 fh.

6. A signal generating circuit in a colour television system, said circuit comprising:
   reference signal oscillation means for oscillating a reference signal of a frequency nfsc (where n is an integer, and fsc is a PAL-system chrominance sub-carrier wave frequency);
   1/162 frequency-dividing means for frequency-dividing to 1/162 the frequency nfsc of the reference signal from the reference signal oscillation means;
   voltage-controlled oscillation means for oscillating a signal of a frequency 282 nf'h (where f'h is a frequency closely approximating the PAL-system horizontal scanning frequency fh);
   1/161 frequency-dividing means for frequency-dividing to 1/161 the output signal of the voltage-controlled oscillation means;
   phase detecting means for phase detecting the output signals supplied from the 1/162 frequency-dividing means and 1/161 frequency-dividing means and controlling the voltage-controlled oscillation means with the output phase-detected signal, the frequency nfsc/162 of the output signal of the 1/162 frequency-dividing means and the frequency 282 nf'h/161 of the output signal of the 1/161 frequency-dividing means being set equal to each other, that is, the relationship (282×162) $nf'h = 161\ nfsc$ being satisfied;
   1/n frequency-dividing means for frequency-dividing to 1/n the frequency nfsc of the reference signal from the reference signal oscillation means thereby to produce the PAL-system chrominance sub-carrier wave signal of a frequency fsc; and
   means supplied with the output signal of the voltage-controlled oscillation means and producing an approximational signal of the PAL-system horizontal scanning frequency and an approximational signal of the PAL-system vertical scanning frequency respectively of frequencies f'h and f'v.

7. A signal generating circuit as claimed in claim 6 which further comprises second 1/n frequency-dividing means for frequency-dividing to 1/n the frequency of the output signal of the voltage-controlled oscillation means thereby to produce an approximational SECAM-system chrominance sub-carrier wave signal of a frequency 282 f'h.

8. A signal generating circuit in a colour television system, said circuit comprising:
   reference signal oscillation means for oscillating a reference signal of a frequency 282 nfh (where n is an integer, and fh is a PAL-system horizontal scanning frequency);
   1/161 frequency-dividing means for frequency-dividing to 1/161 the frequency of 282 nfh of the reference signal from the reference signal oscillation means;
   voltage-controlled oscillation means for oscillating a signal of a frequency nf'sc (where f'sc is a frequency closely approximating the PAL-system chrominance sub-carrier wave frequency fsc);
   1/162 frequency-dividing means for frequency-dividing to 1/162 the output signal of the voltage-controlled oscillation means;
   phase detecting means for phase detecting the output signals supplied from the 1/161 frequency-dividing means and 1/162 frequency-dividing means and controlling the voltage-controlled oscillation means with the output phase-detected signal, the frequency 282 nfh/161 of the output signal of the 1/161 frequency-dividing means and the frequency nf'sc/162 of the output signal of the 1/162 frequency-dividing means being set equal to each other, that is, the relationship $(282\times 162)nfh = 161nf'sc$ being satisfied;

1/n frequency-dividing means for frequency-dividing to 1/n the frequency nf'sc of the output signal from the voltage-controlled oscillation means thereby to produce a signal of a frequency f'sc; and means supplied with the output signal of the frequency-subtraction means and producing an approximational signal of the PAL-system horizontal scanning frequency and a signal of the PAL-system vertical scanning frequency respectively of frequencies fh and fv.

9. A signal generating circuit as claimed in claim 8 which further comprises second 1/n frequency-dividing means for frequency-dividing to 1/n the frequency of the reference signal from the reference signal oscillating means thereby to produce a SECAM-system chrominance sub-carrier wave of a frequency 282 fh.

10. A signal generating circuit in a colour television system, said circuit comprising:

first means for producing a signal of a frequency of 282 nfh (where n is an integer, and fh is a PAL-system horizontal scanning frequency);

second means for frequency-dividing to 1/161 the signal of the frequency 282 nfh to produce a signal of a frequency 282 nfh/161;

third means for producing a signal of a frequency nf'sc (where f'sc is a frequency closely approximating a PAL-system chrominance sub-carrier wave frequency) in response to the signal of the frequency 282 nfh and the signal of the frequency 282 nfh/161 so that the relationship $(282\times 162)nfh = 161nf'sc$ is satisfied;

fourth means for frequency-dividing to 1/n the frequency nf'sc of the signal from the third means and producing a signal of a frequency f'sc; and fifth means supplied with the signal from the first means and producing signals of the PAL-system horizontal scanning frequency and vertical scanning frequency respectively of frequencies fh and fv.

* * * * *